(12) United States Patent
Langford (10) Patent No.: US 11,156,845 B2
(45) Date of Patent: Oct. 26, 2021

(54) ID MAGNIFYING DEVICE

(71) Applicant: Del Langford, Las Vegas, NV (US)

(72) Inventor: Del Langford, Las Vegas, NV (US)

( * ) Notice: Subject to any disclaimer, the term of this patent is extended or adjusted under 35 U.S.C. 154(b) by 70 days.

(21) Appl. No.: 16/537,528

(22) Filed: Aug. 10, 2019

(65) Prior Publication Data

US 2020/0073132 A1 Mar. 5, 2020

Related U.S. Application Data

(60) Provisional application No. 62/765,575, filed on Aug. 31, 2018.

(51) Int. Cl.
*G02B 27/02* (2006.01)
*B42D 25/23* (2014.01)

(52) U.S. Cl.
CPC .......... *G02B 27/027* (2013.01); *B42D 25/23* (2014.10); *G02B 27/025* (2013.01)

(58) Field of Classification Search
None
See application file for complete search history.

(56) References Cited

U.S. PATENT DOCUMENTS

| | | | | |
|---|---|---|---|---|
| 3,675,354 A | * | 7/1972 | Webb | G02B 27/025 40/367 |
| 4,923,282 A | * | 5/1990 | Spitzberg | G02B 25/007 359/737 |
| 6,735,022 B1 | * | 5/2004 | Solitt | A47F 7/02 206/566 |
| 7,161,747 B2 | * | 1/2007 | Yang, Jr. | A45C 11/182 359/742 |
| 7,430,080 B2 | * | 9/2008 | Cintz | G02B 25/005 359/802 |
| 2017/0275053 A1 | * | 9/2017 | Wartersian | A61J 1/03 |

* cited by examiner

*Primary Examiner* — Sunit Pandya
(74) *Attorney, Agent, or Firm* — Invention To Patent Services; Alex Hobson (57) ABSTRACT

A device including a compartment section, wherein the compartment section is configured to host ID or cards; a bottom wall disposed on a proximate bottom portion of the compartment section; at least three or more closed sidewalls and an open sidewall generally surrounds the compartment section, wherein the open sidewall is configured to be operable for accepting a magnifying lens; a magnifying lens, the magnifying lens is configured to magnify the ID or card for viewing; an open area disposed on a proximate top portion of the compartment section, wherein the open area is configured as an entry point of the ID or card; a base section that is configured to support the device against a surface area; and a U-shaped bracket implement that is configured to be operable for engaging the compartment section to the base section.

16 Claims, 8 Drawing Sheets

ID MAGNIFYING DEVICE

CROSS-REFERENCE TO RELATED APPLICATIONS

The present Utility patent application claims priority benefit of the [U.S. provisional application for patent Ser. No. 62/765,575 entitled "ID Magnifier", filed on Aug. 31, 2018, under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to magnification systems. More particularly, certain embodiments of the invention relate to magnifying devices.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. In general, text on many types of identification (ID) cards, credit cards, etc. is very small and may be difficult for many people, especially those over 40, to read. If the user must read that text and enter that information into a computer or log it in anyway, it may be time consuming and eye straining. Typically, the person must refer back and forth to the card multiple times. Each time they must pick up the card and place it close to their face or use a currently available magnifier. However, currently available magnifiers require the use of at least one hand, and while they might help the person see that small text, currently available magnifiers do not speed up the process.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that one particular vocational task requires focus, concentration, exceptional accuracy and speed, and even one simple error may be costly. It can be strenuous upon the worker performing this task, too, even harmful to their eyesight, necks, and spinal columns. Lower back pain is a common risk in many employment fields, and so are sore shoulders, chronic neck, and spine pain. Let's not forget about the eyes, either, along with the headaches, vision problems, and even physical exhaustion such strain may produce. We're not talking about brain surgery, firefighting, road construction, roofing, cattle wrestling or any other of the risky jobs in hazardous employment fields, or anything like that. We're talking about sitting at a desk and entering data with a keyboard. That's right—just sitting at a desk to enter data into a computer may create serious physical risks.

We're talking about the common task of entering data from small cards, such as driver's licenses. It requires speedy accuracy but is well-known to cause painful conditions. Your head flips up and down between the item lying on your desk, which you examine for information, and the computer monitor, which you view to ensure you're entering that data correctly. This may make you subject to injuries, strains, and pains. Not just simply a sore neck, either. Repetitive strain injuries (RSI), sharp neck and spinal pain, stenosis, and herniated discs as a direct result of this ordinary motion are growing in frequency. In fact, 59 percent of office workers suffer from these job-related neck disorders on an annual basis, according to medical studies. Don't forget the stress on the eyes. They zoom in to focus on the small print displayed on an identification card, then quickly have to refocus to the lighting of the monitor. This not only stresses the eyes and their focus reflexes, but may also damage them, causing asthenopia, which may result in blurred vision and temporary double vision, along with serious headaches.

Further, while errors may occur in any occupational field, there are few that hold as much risk as errors in data entry. A mistyped address may result in uncollected debt. A mistyped name may result in false arrest. Any mistyped data in medical environments—be it an incorrect name or age or even wrong weight or blood pressure—may result in improper medication, additional sickness and even death. This is why companies that employ data-entry workers insist on accuracy, and also regularly track accuracy, which in some fields requires a 99-percent minimum. They even promote their trades based on such numbers. Even that low one percent error rating is quite costly, though. There are recent examples of disastrous results caused by incorrect data entry. Typographical errors in one form used by the National Crime Information Center resulted in approximately 9,000 false arrests, for example, and another minor typo by a financial firm cost S&P 500 companies over $150 million in revenue. A primary cause of such errors isn't lazy workers and not sloppy typing, either. It's caused by having to refer and re-refer back to a physical source of data, and especially when that data is printed very small. That neck-flipping and squinting, that consistent back and forth from source to monitor, is what causes many of these errors. It is believed that such errors may be prevented or at least the negative impacts caused by those errors can be reduced.

Moreover, there are a number of jobs that require data entry from ID cards. Secretaries are one example of such a job, especially legal and medical secretaries. Bank tellers and customer service representatives are two more examples, and for every person working on airport runways, there may be 25 employees inside that need to enter passenger data from ID cards and tickets. In occupations that require entry of data acquired from identification cards, there may be about fourteen (14) million employed. And, a majority of workers in such fields may suffer from pain and injury due to this task.

Now picture a secretary who needs to enter information from identification cards and business cards into a database. At the average rate of $13 an hour for secretaries in office support roles, this may become an expensive task. Especially since the worker must hold up the card to read the first line of data, then put it down so the information may be entered, then pick it up again so the next line may be viewed, and then again put it down for that information to be typed. This view-stop-type pattern happens over and over again until the task is completed.

In view of the foregoing, it would be desirable to perform the common task of entering data from small cards, such as driver's licenses without neck flipping and eye strain, and for said data to be kept in a convenient and ergonomic location that's easy to see, and that would increase productivity and profitability.

Typical magnifying sheets and lenses currently available are generally large and must be held by hand during use. Because these available products occupy one or both hands, they may make it difficult to perform tasks, such as entering data in a computer when reading that data from a driver's license. For instance, a sky cap (aka curb side check-in person) at airports must be able to quickly check in luggage. During the process, they must check the user's ID and enter that ID info into their computer. Since the text on driver's licenses and other types of ID is generally small, it would be very time consuming for the sky cap to pick up a magnifying lens, read the small text, put down the lens, enter the amount of text they can remember, and then repeat until they have all the text entered and verified. If the sky cap, and many others in occupations and hobbies that require reading of small data, could place the ID in a magnifier and easily read it while both hands are free to work the keyboard or perform another task, that would be ideal.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A and FIG. 5B are illustrations of a side view of an exemplary ID magnifying device.

FIG. 6A is an illustration of elements comprising an exemplary ID magnifying device, FIG. 6B is an expanded view of an edge of an ID/Card Hosting Compartment holder, and FIG. 6C is an expanded view of an engagement of a U-bracket and base, in accordance with an embodiment of the present invention;

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see *Ex parte Mallory,* 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) *Hybridtech v. Monoclonal Antibodies, Inc.,* 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co. v. Industrial Crating & Packing, Inc.,* 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See *In re Frye,* Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See *Dana Corp. v. American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp. v. Medtronic AVE Inc.,* 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); *Epcon Gas Sys., Inc. v. Bauer Compressors, Inc.,* 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp. v. Vaughan Co.,* 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp. v. Medtronic AVE, Inc.,* 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see *Epcon,* 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc. v. Bauer Compressors, Inc.,* 279 F.3d 1022 (Fed. Cir. 2002) (construing the terms "substantially constant" and "substantially below"); *Zodiac Pool Care, Inc. v. Hoffinger Indus., Inc.,* 206 F.3d 1408 (Fed. Cir. 2000) (construing the term "substantially inward"); *York Prods., Inc. v. Cent. Tractor Farm & Family Ctr.,* 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. *Prima Tek,* 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp. v. Sollac,* 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp. v. Micron Separations, Inc.,* 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC v. Crane Cams Inc.,* 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp. v. Gabriel Elecs. Inc.,* 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc. v. Envirochem, Inc.,* 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc. v. Envirochem Inc.,* 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp. v. Micron Seps.,* 66 F.3d 1211, 1217, 36 USPQ2d 1225, 1229 (Fed. Cir. 1995); see, e.g., *Andrew Corp. v. Gabriel Elecs. Inc.,* 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory,* 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re *Hutchison,* 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art.

Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, are generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of the or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology

The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components is described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Some embodiments of the present invention and variations thereof, relate to ID magnifying devices. In one embodiment of the present invention, the ID Magnifying Device may improve the speed, accuracy, and convenience of common data-entry tasks. The ID Magnifying Device may host identification cards and similar items in an upright position and includes a magnifying lens in front of the hosted card. The device may allow the printed data on said card to be easily seen without being held by hand, thus allowing use of both hands for other tasks, such as entry of said printed data into a computer system. The ID Magnifying Device may feature, but not limited to, a rectangular compartment with an open top plane, and a magnifying lens forming one (1) sidewall of said compartment. A U-bracket is further featured for hosting of said rectangular compartment. Tension screws are featured to attach, and allow angular adjustment of, the rectangular compartment upon the U-bracket. A base is further featured for hosting of said U-bracket. A frictional coating is featured on the bottom plane of the base.

In some embodiments, a device may provide a hands-free holding of a card, such as, but not limited to, a driver's license, and magnifies the text of the card so it's easily viewable. The device may comprise a hands-free card holder with magnification capabilities that includes, but not limited to, a Base, U-Bracket and a Compartment. The Compartment is cradled by the U-Bracket and held in place by tension screws. The U-Bracket may be applied to the Base via screws. The tension screws allow the placement angle of the Compartment to be easily adjusted to accommodate the specific viewing needs of the user. The front plane of the Compartment is produced in an open format and may accept the insertion of different magnification lenses. It's these magnification lenses that are used to magnify the text/content of the ID card, credit card, driver's license, etc. One wall plane of the Compartment may further comprise two vertical sidewalls and a lower horizontal wall creating a lens holding area, and the vertical walls acting as guides. A magnifying lens features a Lens Frame and each vertical wall of said lens frame features a channel. The channels of the lens frame slide over the channel guides disposed on the frame of the Compartment to hold the magnifying Lens in place. A Rubber cap is featured to hold the Lens in place on the Compartment. The cap features a channel that snugly fits over the perimeter of the compartment and the top of the lens to hold the lens in place. The top plane of the Compartment is open allowing access to the interior of the Compartment. The opening is configured to allow ID cards to be inserted and removed. The large opening is important to the functionality of the product as it allows the user easy and unimpeded access to insertion and removal of the card, which means the product is easy and quick to use. The device may be set flat and rest upon its base when on a horizontal surface such as a desktop. The Base may be removable and transportable. And, the U-Bracket may be secured to a horizontal surface such as the wall of a workstation. In alternative embodiments, the Base may include two arms projecting from it. The compartment can be secured to the arms via, but not limited to, tension screws. Additionally, in alternative embodiments, the lens is permanently in place on the compartment and not interchangeable.

In other embodiments, the ID Magnifying Device hosts items that commonly have printing of small font sizes such as, but not a limitation, driver's licenses, identification cards, credit cards, insurance cards, membership cards, business cards, and similar items, The device may improve the visibility of the small-font sizes, magnifies the small-font print, allows its user to view the magnified small-font print of its hosted item without having to manually hold said items, and allow its user to view and read the small-font print on such items. By eliminating a need to hold the print-bearing object or a magnifying glass in order to improve visibility of small-font print, the ID Magnifying Device allows its user to engage in other actions with both hands. In some embodiments, the ID Magnifying Device allows its user to engage in two (2)-handed activities related to such items and their small-font print, and allows its user to speed the manual entry of the magnified data into a computer or similar device. By improving the speed of the task of entering data from small ID cards, the ID Magnifying Device may improve the productivity of its user, reduce the labor cost of its user, and improve the profitability of its user and/or the employer of its user. In addition, by allowing consistency in data entry without having to consistently glance away and lift the source, the ID Magnifying Device may improve the accuracy of such data entry. Furthermore, the ID Magnifying Device benefits the industries in which data entry from small-sized objects, such as but not limited to identification cards, credit cards, and business cards, is part of a labor task and benefits the workers in such industries, which include but are not limited to airline baggage checking, transportation security, mailing list data entry, administrative assistance, voter registration offices, medical fields, finance, and insurance.

In some embodiments, the card-hosting compartment of the ID Magnifying Device may be positioned at various desired angles. By allowing the card-hosting compartment to be rotated, the ID Magnifying Device may be personalized in position to accommodate individual users. This accommodation ensures that the ID Magnifying Device may be used in a comfortable and consistent position. The lining on the bottom plane of the base provides frictional grip upon a hosting surface, such as a desk or table. The large open plane of the card-hosting compartment allows for easy and quick insertion and removal of cards.

In additional embodiments, the ID Magnifying Device can be produced in various sizes and shapes, including specific sizes and shapes designed for use with specific items, such as but not limited to identification cards, passports, and other relevant items. The ID Magnifying Device may be made of various materials of adequate durability, such as but not limited to polycarbonate and acrylic. The convex lens may be of various levels of magnification and various corresponding focal lengths. The convex lens may be interchangeable in order to allow a user to pick the level of magnification that best suits their needs to a particular task. The U-bracket may or may not include a lining on its bottom surface. The Base may or may not include a lining on its bottom surface. The ID Magnifying Device may include a lighting piece and said lighting piece may be positioned at various strategic points of the structure. The ID Magnifying Device may include a feature that ensures the hosted identification card remains in an upright position, such as but not limited to an engraved channel into which the edge of the card may be inserted. The ID Magnifying Device may be made in various colors and may bear various designs, images, and/or logos, which may or may not be of registered trademark and/or copyright status.

In additional embodiments, the card-hosting compartment of the ID Magnifying Device may be made of, but not limited to, a polycarbonate plastic material, and in a rectangular shape of an approximate three and one-half inch width by two-inch height by three-inch depth (3.5"×2"×3"). Extending from the centers of the sidewalls of the compartment are axles with centered apertures. The front face of the compartment is open and features slots (also known as guides) in its perimeter walls. Lens plates of various levels of magnification are included for insertion within said slotted perimeter walls. Identification cards may be applied within the compartment for their magnification by said lens plate. The top plane of the compartment is open and a separate cap-like piece is included to tightly cover the top perimeter when a magnifying lens plate is applied to the front face of the compartment. The U-bracket of the ID Magnifying Device may be made of, but not limited to, a polycarbonate plastic material. The U-bracket horizontal base measures approximately four inches in length by three inches in width (4"×3"), and features about two (2) apertures, through which two (2) included screws may be inserted for attachment of the U-bracket to a hosting base. Two (2) vertical arms of the U-bracket may extend at more or less ninety-degree(90°) angles from each length-end of the horizontal portion, and rise for approximate heights of three inches (3"). Apertures are featured in the vertical arms, and for alignment with the projecting axles of the sidewalls of the card-hosting compartment. Tension screws may be included for insertion into these apertures, connecting the compartment to the U-bracket. The hosting base measures approximately four inches in length by three inches in depth by one inch in height (4"×3"×1"). Generally centered on the top surface of the hosting base are two (2) threaded apertures, aligned with the apertures of the U-bracket, and the screws be inserted for attachment of said U-bracket to the hosting base. The bottom plane of the hosting base is lined with, but not limited to, a synthetic rubber material.

In use, a user may position the ID Magnifying Device at a workplace point near his or her computer that is convenient and comfortable to view. The user may then adjust the rotation of the base to an angle that is of alignment to his or her eyesight. The user may then tighten the tension screws to maintain the ID Magnifying Device in that desired position. Now they may insert an identification card or other source within the compartment. They may then easily and quickly enter data derived from that hosted identification card with full and enlarged view of its text. The data may be entered with both hands, as well, as the ID Magnifying Device independently supports the card hosting that data.

In some embodiments, the ID Magnifying Device may include a portable and adjustable holder for ID cards and the like. One sidewall of the holder is a magnifying lens. The device holds, magnifies and focus the card for the user in a hands-free format. This may allow the user to easily read the card while conducting tasks with their hands, such tasks as but not limited to data entry. The ID Magnifying Device may be mounted on a desk, wall or other surfaces, or it may simply sit on a flat surface such as a desk top. The ID Magnifying Device is also easily adjustable, so the user may set the angle of the holder at whatever position best serves them. Accordingly, this may improve convenience, speed and accuracy, minimize the causes of lower back pain, sore shoulders, and chronic neck and spine pain, and may help its users improve accuracy, productivity and profit.

In some embodiments, the device may host items like business cards, identification cards, and other small data-bearing items of similar size, and magnifies them to allow their small-printed data to be easily read. The device lets the user place those items in a comfortable and personalized location, and magnifies that small print. The device features a translucent plastic card holder into which the cards may be inserted and includes a convex plane on one side to magnify those cards. A hosting frame in the format of a U-bracket is included and features tensions screws that allow the card holder to be rotated to a user-desired angle. The base includes a textured lining to ensure secure placement of the device. The ID Magnifying Device hosts the card in an ergonomic and strategic position, magnifies the card and its data, and improves the speed in which that data can be entered into a computer by a user. The ID Magnifying Device may improve the accuracy of its user, while eliminating the causes of stress and strain on the neck, back, and eyes.

In further embodiments, an ID Magnifying Device may be made of, but not limited to, a translucent PC in rectangular shape, measuring more or less 3.5"×2"×3". The ID Magnifying Device may include an open top plane to accept inserted cards and a convex lens for magnifying the letters, fonts, etc. of the card. A front face of the convex lens format provides 5× magnification. The ID Magnifying Device may include, but not limited to, apertures that are generally centered on each vertical sidewall, a U-bracket made of PC for hosting of card holder, apertures on each vertical arm of the U-bracket that are generally configured to be centered and aligned with those of compartment, tension screws that are generally configured to be operable for attachment of card holder to the U-bracket, and synthetic rubber lining on a generally bottom plane of the base. In beneficial embodiments, the card holder device may, but not limited to, allow the data included in that print to be legibly seen from a reasonable distance, allow the data to be legibly seen without need to manually hold the item bearing the data, allow the data to entered without interruption caused by holding the item in one hand, improves the speed and accuracy of data entry, eliminates the risks of inaccuracy in data entry, reduces the costs of data entry, improves the productivity of workers and companies, reduces production costs of such companies, eliminate high risks of neck discomfort, RSI, stenosis, and cervical/spinal pain and disorders, and eliminate negative results of asthenopia, including headaches, fatigue and vision problems.

The present invention will now be described in detail with reference to embodiments thereof as illustrated in the accompanying drawings.

Figure 1:
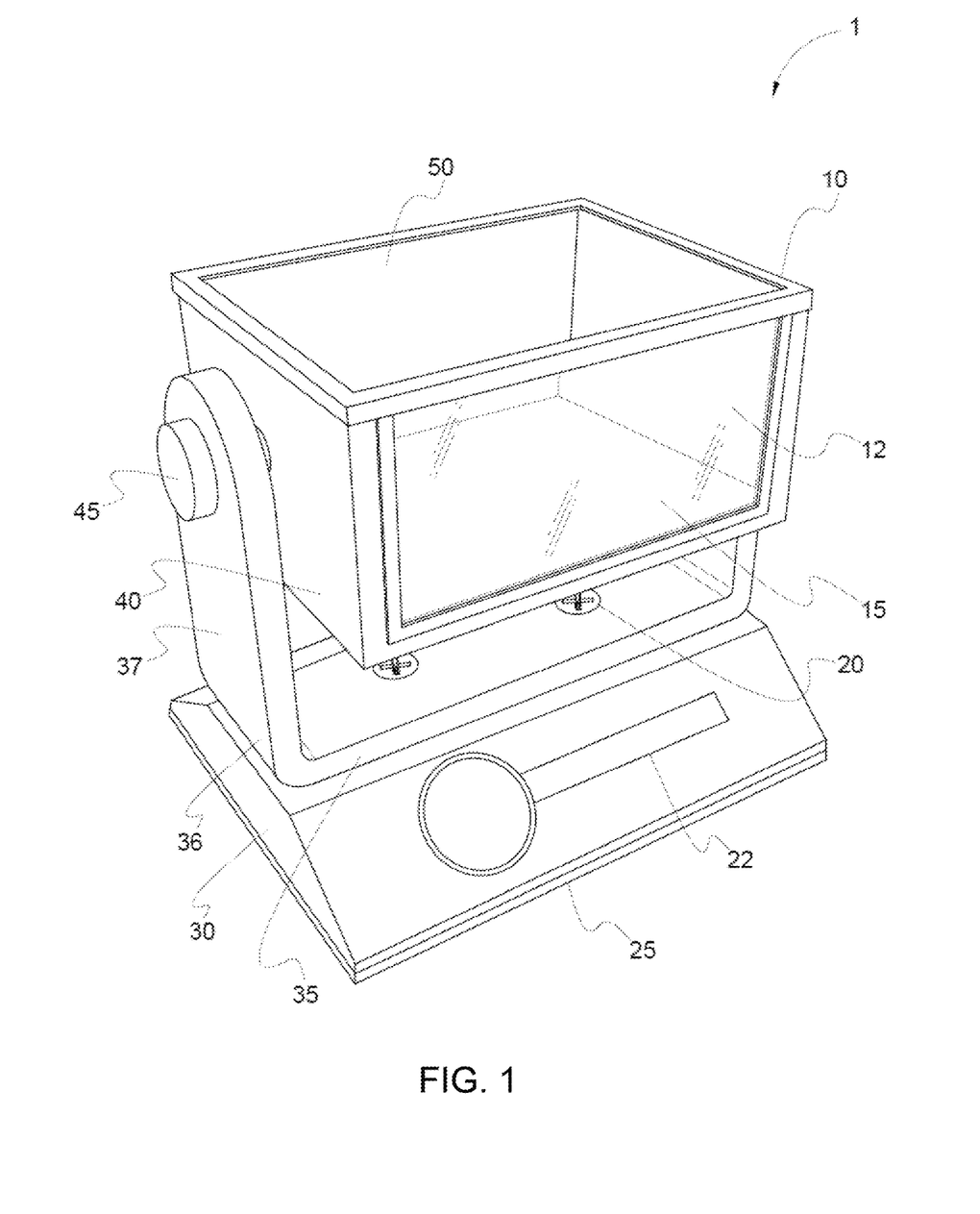
FIG. 1 is an illustration of a front view of an exemplary ID magnifying device, in accordance with an embodiment of the present invention.

FIG. 1 is an illustration of a front view of an exemplary ID Magnifying Device 1, in accordance with an embodiment of the present invention. In the present embodiment shown, the device may include a compartment or an ID/Card Hosting Compartment 40 with a Lens-Retaining Cap 10, an Open Area 50 for inserting an ID or like card, and a Magnifying Lens 15 for magnifying the contents of the compartment such as text of the ID/card so it's easily viewable. The device may further include a U-shaped Bracket or U-Bracket implement 36 having a bottom portion 35 and an arm portion 37. A Base section 30 may comprise a proximate bottom portion generally covered with a lining material 25 that is configured to support the device against a surface, four (4) or more sidewalls where two (2) of the sidewalls are proximately sloped. A display area 22 may be disposed on a sloping section of the sidewall, and a top portion may be configured to attach with the U-Bracket implement. A U-shaped Bracket implement fastening mechanism 20 including, but not limited to, screws, nails, plastic fasteners, anchors, nuts and bolts, holes, threaded apertures, etc. (FIG. 6C) that may be configured to attach bottom portion 35 of U-shaped Bracket implement 36 to Base section 30. The ID/Card Hosting Compartment 40 may further include a bottom wall, four (4) or more sidewalls where one of the sidewalls is an open sidewall 12 for insertion of a Magnifying Lens 15. A Tension Screw 45 including, but not limited to, a screw, bolt, fly shop screw, etc. secures the compartment 40 to U-bracket arm portion 37. In additional embodiments, ID/Card Hosting Compartment 40 may further include a rectangular, square, oval, polygonal or multi-sided shaped ID/Card Hosting Compartment 40. The lining material 25 may include, but not limited to, a textured rubber/plastic/silicone material. The bottom portion of U-Bracket Implement 36 may be attached to a surface including, but not limited to, a vertical wall, a desk sidewall, etc. using the same screws used to attach the U-Bracket implement to the base section. The Open Area 50 may include a cover (not shown) when not in use. The base section display area 22 may exhibit but not limited to, a logo, a symbol, an emblem, an instruction on how to use the device, etc. Additionally, U-Bracket implement fastening mechanism 20 may further include, but not limited to, adhesive fasteners, plastic fasteners, anchors, nuts and bolts, etc., operable for engaging the device to a metal surfaces, cement surfaces, and/or wooden surfaces. In alternative embodiments, U-Bracket implement 36 may directly engage a surface. The lining material 25 may include an adhesive material for attaching to a surface.

Figure 2:
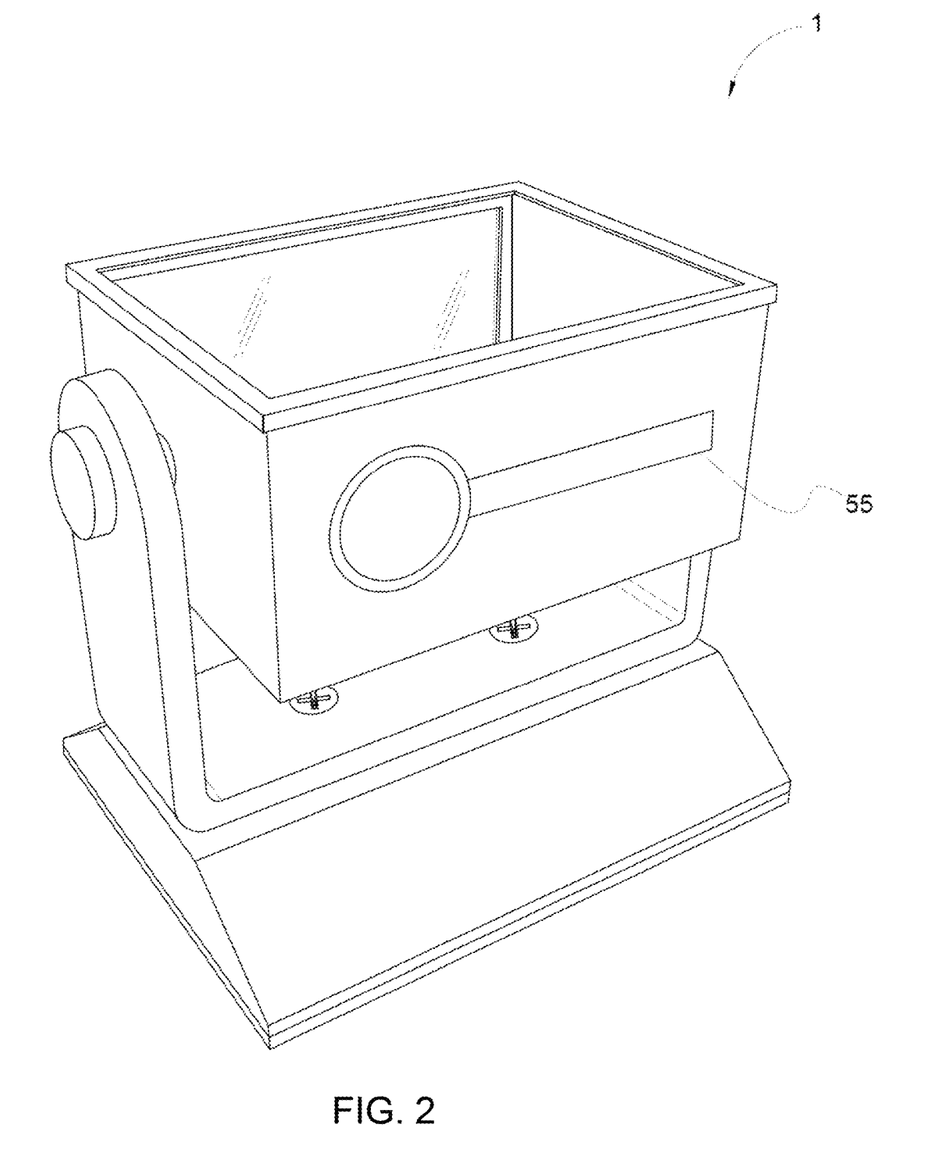
FIG. 2 is an illustration of a back view of an exemplary ID magnifying device, in accordance with an embodiment of the present invention.

FIG. 2 is an illustration of a back view of an exemplary ID magnifying device 1, in accordance with an embodiment of the present invention. In the present embodiment shown, a back portion of the ID/Card Hosting Compartment shows a notification area 55 for displaying, but not limited to, a logo, an emblem, a trademark, a symbol, and/or instructions on how to use the device, etc. Alternatively, the notification area 55 may include a note board for sticking notes.

Figure 3:
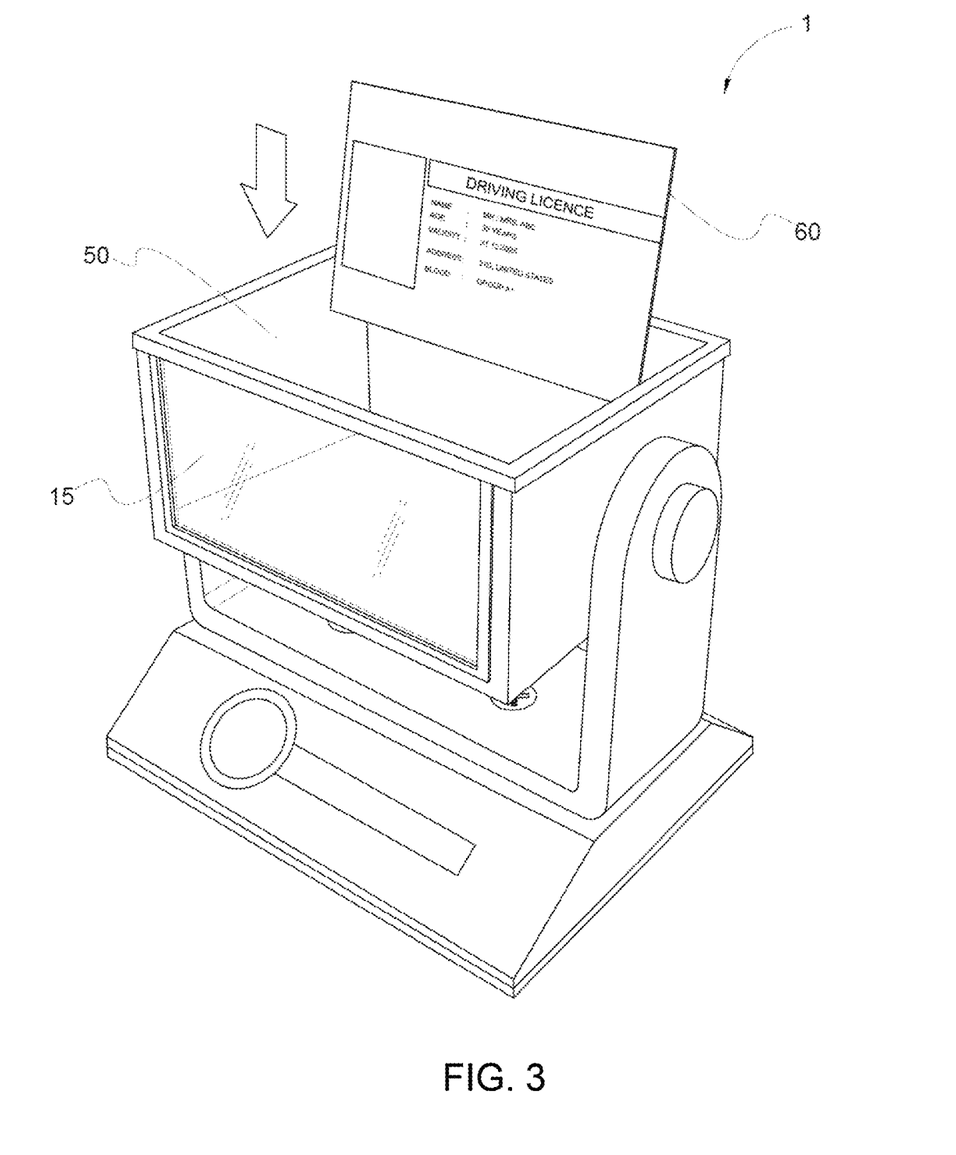
FIG. 3 is an illustration of an exemplary usage of an ID magnifying device, in accordance with an embodiment of the present invention.

FIG. 3 is an illustration of an exemplary usage of an ID magnifying device, in accordance with an embodiment of the present invention. In the present embodiment shown, a driver's license 60 is disposed in the device (as shown with the arrow), through open area 50, to be read through magnifying lens 15.

Figure 4:
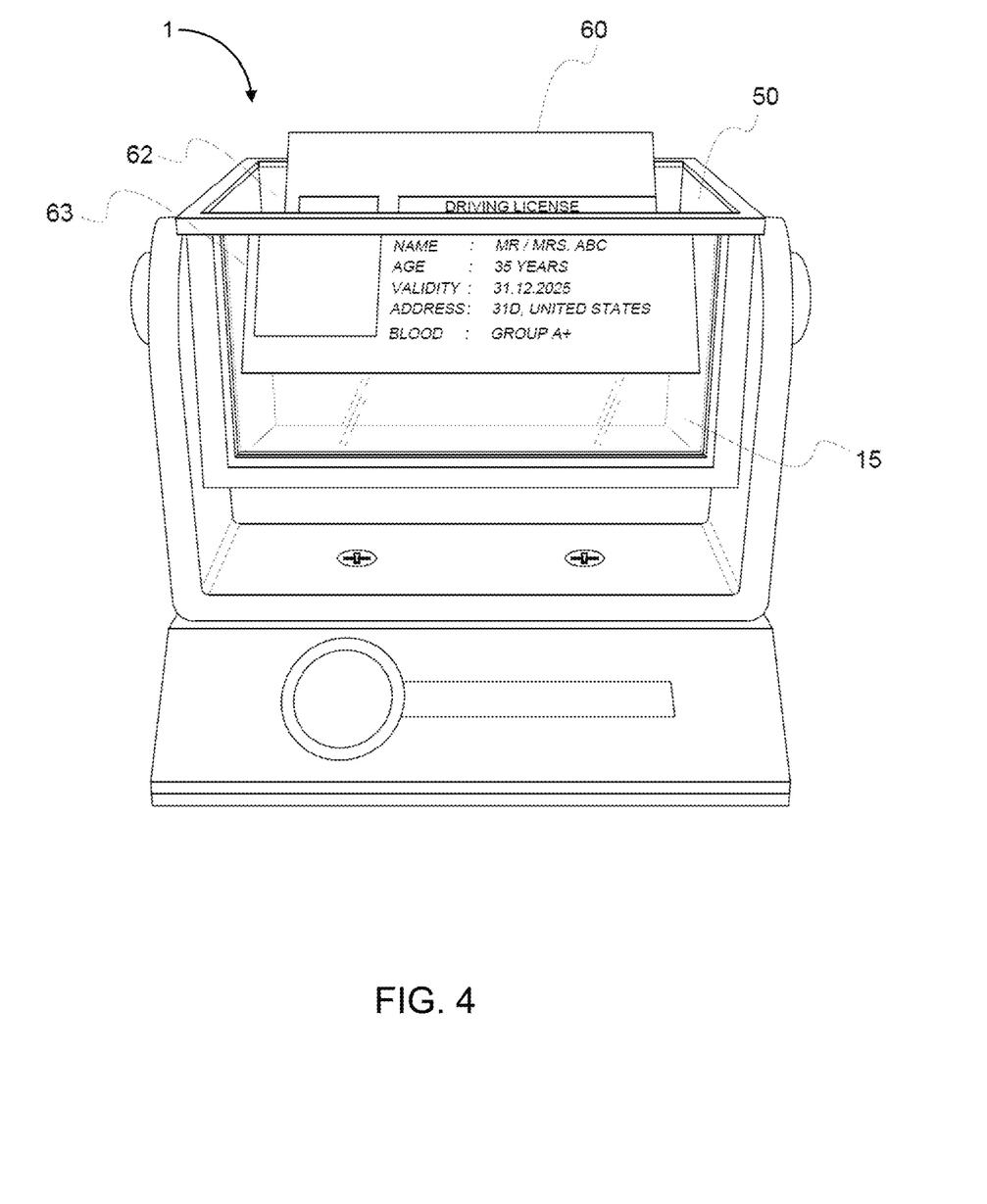
FIG. 4 is an illustration of an exemplary usage of an ID magnifying device, in accordance with an embodiment of the present invention.

FIG. 4 is an illustration of an exemplary usage of an ID Magnifying Device 1, in accordance with an embodiment of the present invention. In the present embodiment shown, a driver's license 60 is hosted in device 1, through open area 50. The magnifying lens 15 is shown magnifying print 63 on driver's license 60, in contrast to non-magnified prints 62 on driver's license 60. In additional embodiments, similar techniques shown in FIG. 3 and FIG. 4 may instead be applied to magnifying other objects such as little rocks, minerals, gems, etc., specimens such as insects, little animals, plants, etc., and/or other specimens and objects used as an example of its species or type for scientific study or display.

Figures 5A, 5B:
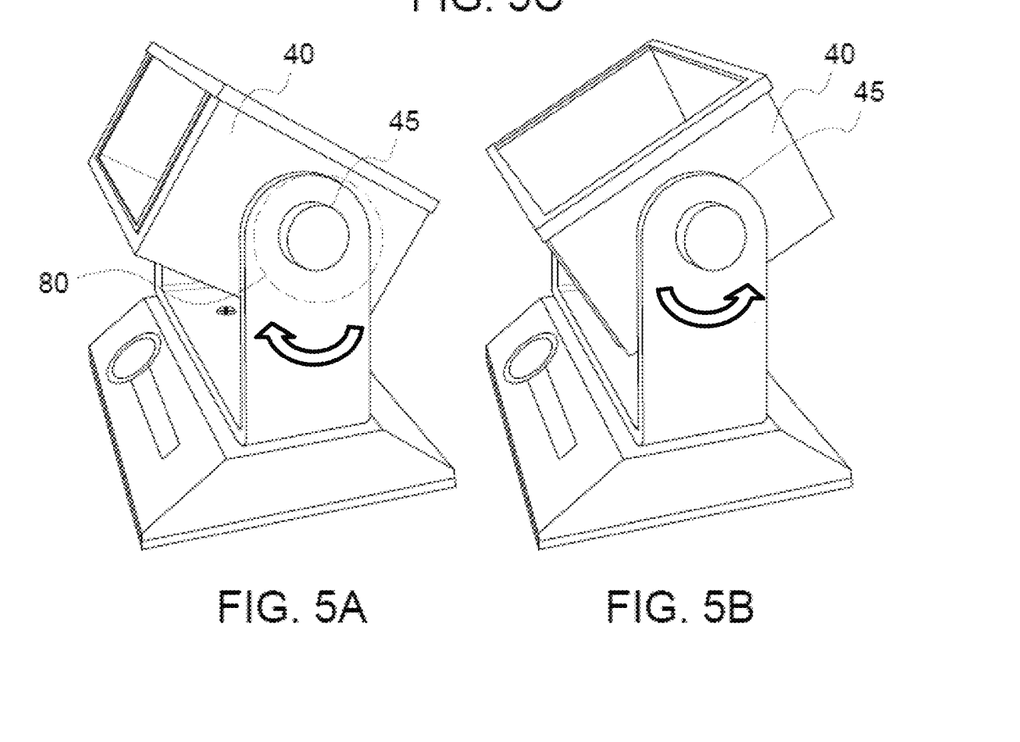
Figure 5C:
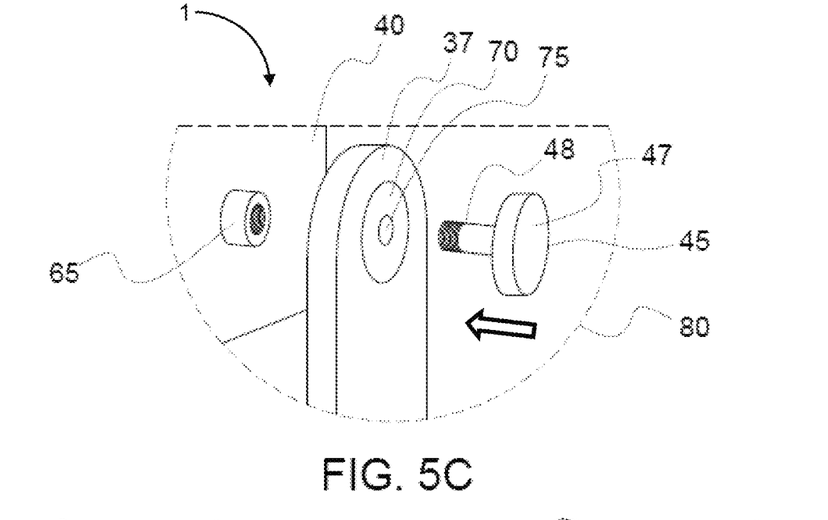
FIG. 5C is an expanded view of a compartment section engagement mechanism, in accordance with an embodiment of the present invention.

FIG. 5A and FIG. 5B are illustrations of a side view of an exemplary ID Magnifying Device 1, and FIG. 5C is an expanded view of a compartment engagement mechanism 80, in accordance with an embodiment of the present invention. In the present embodiment, FIGS. 5A and 5B illustrates two views showing an angle of rotation of compartment section 40 that is configured to be adjustable to meet a viewer's/user's needs, where the angle may be adjusted and held in place with Tension Screw 45. The compartment section 40 may be rotated clockwise or counterclockwise while being held by the extended part of Tension Screw 45. FIG. 5C illustrates an expanded view of a compartment engagement mechanism 80, showing the different elements that holds compartment 40 in place. In FIG. 5C, compartment section 40 is engaged to U-bracket arm 37 with a Tension Screw 45. The Tension Screw 45 may include a head portion 47 for allowing a user to apply tension and hold the compartment section in place. The Tension Screw 45 may further include an extended part 48 with a non-threaded part on a proximate center of the extended part and a threaded part disposed on proximate end portion of the extended part for engaging an attachment means 65 of the compartment. The non-threaded part of extended part 48 is held in place through an aperture section 75 disposed on a proximate top segment of the U-bracket arm 37. The aperture section 75 may include a support implement 70 having a material configured to support a weight of compartment section 40. A threaded aperture 65 disposed on a sidewall of the compartment engages the threaded portion of the extended part 48 to hold compartment 40 against U-bracket arm 37.

Figures 6A, 6B, 6C:
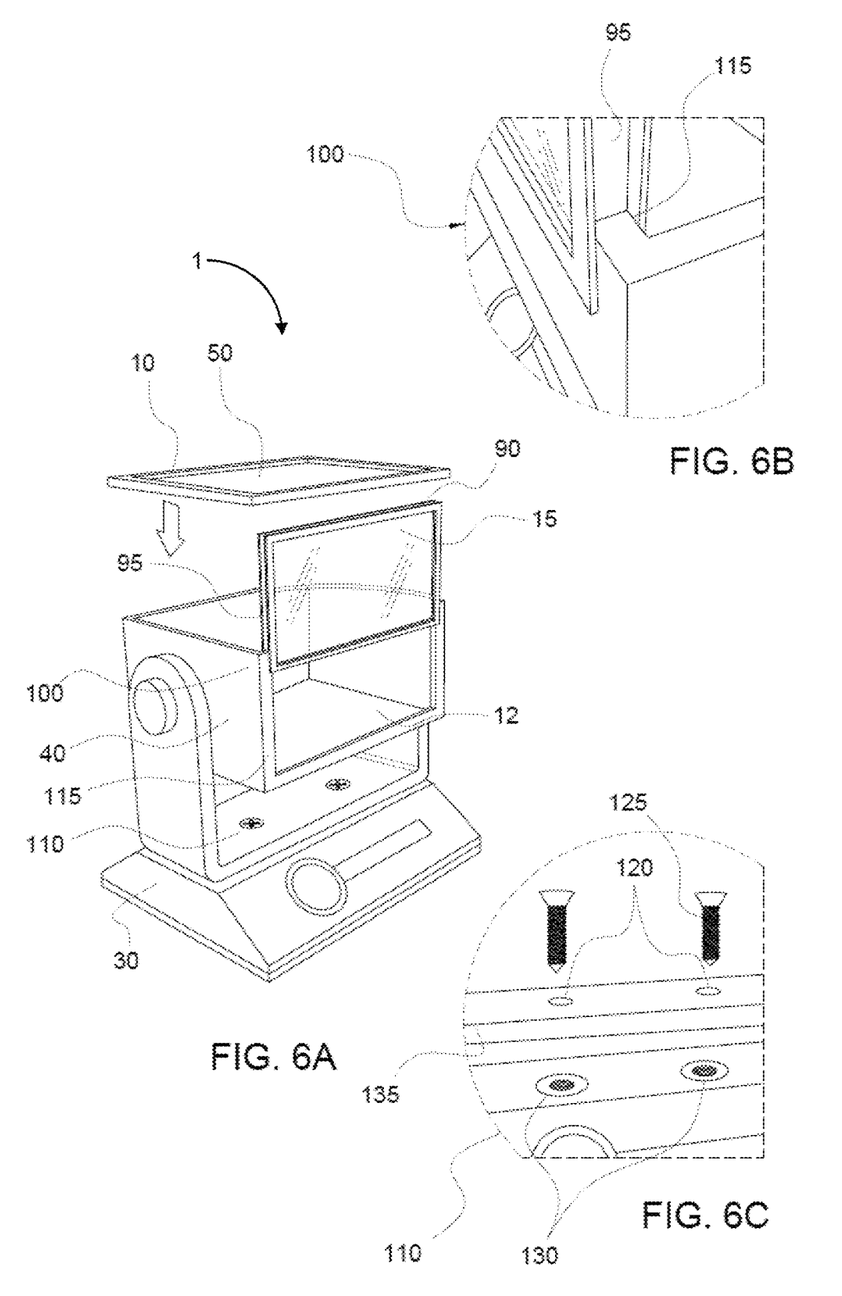

FIG. 6A is an illustration of elements comprising an exemplary ID Magnifying Device 1, in accordance with an embodiment of the present invention. In the present embodiment shown, the ID Magnifying Device 1 may comprise a Magnifying Lens 15, a lens retaining cap 10, a magnifying lens frame 90, a lens frame 90 surrounding and protecting the edges of magnifying lens 15, a lens frame channel portion 95 for engaging the vertical and bottom walls of the compartment open sidewall, a lens frame channel guide 115 disposed on the vertical and bottom walls of the compartment open sidewall, an expanded view 100 of an engagement of a proximate edge of the vertical wall and the lens frame channel guide, and an expanded view of a fastening mechanism 110 engaging the U-bracket and the base section 30. FIG. 6B illustrates an expanded view 100 of an engagement of a proximate edge of Compartment 40 and lens frame channel guide 115. And, FIG. 6C shows an expanded view of an engagement of the U-bracket and the base section utilizing a fastening mechanism, in accordance with an embodiment of the present invention. In FIG. 6B, the expanded view 100 of an engagement of a proximate edge of Compartment 40 and lens frame channel guide 115 shows lens frame channel 95 engaging lens frame channel guide 115 of compartment 40. In FIG. 6C, an expanded view of the engagement 110 of the bottom portion of the U-bracket and a generally top portion of the base section shows the fastening mechanism including screws 125, holes 120 disposed on a bottom arm portion 135 of the U-bracket for accepting screws 125, and at least two or more threaded apertures 130 disposed on a top portion of base section 30.

Figure 7:
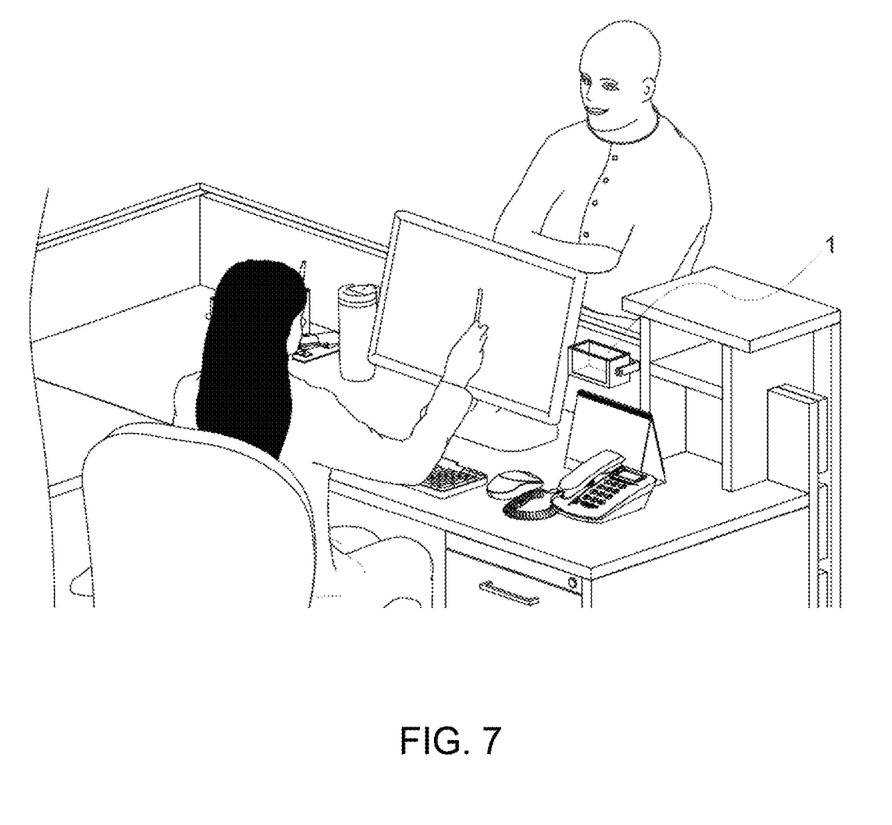
FIG. 7 is an illustration of an exemplary ID magnifying device secured to a vertical surface, in accordance with an embodiment of the present invention.

FIG. 7 is an illustration of an exemplary ID Magnifying Device 1 secured to a vertical surface of a counter top/table sidewall, in accordance with an embodiment of the present invention. In the present embodiment shown, ID Magnifying Device 1 is secured under a counter top/table, on a vertical surface of a counter top/table sidewall. The ID Magnifying Device 1 may be secured with the base section or with the U-bracket (without the base section) using screws, nails, adhesive, etc.

Figure 8:
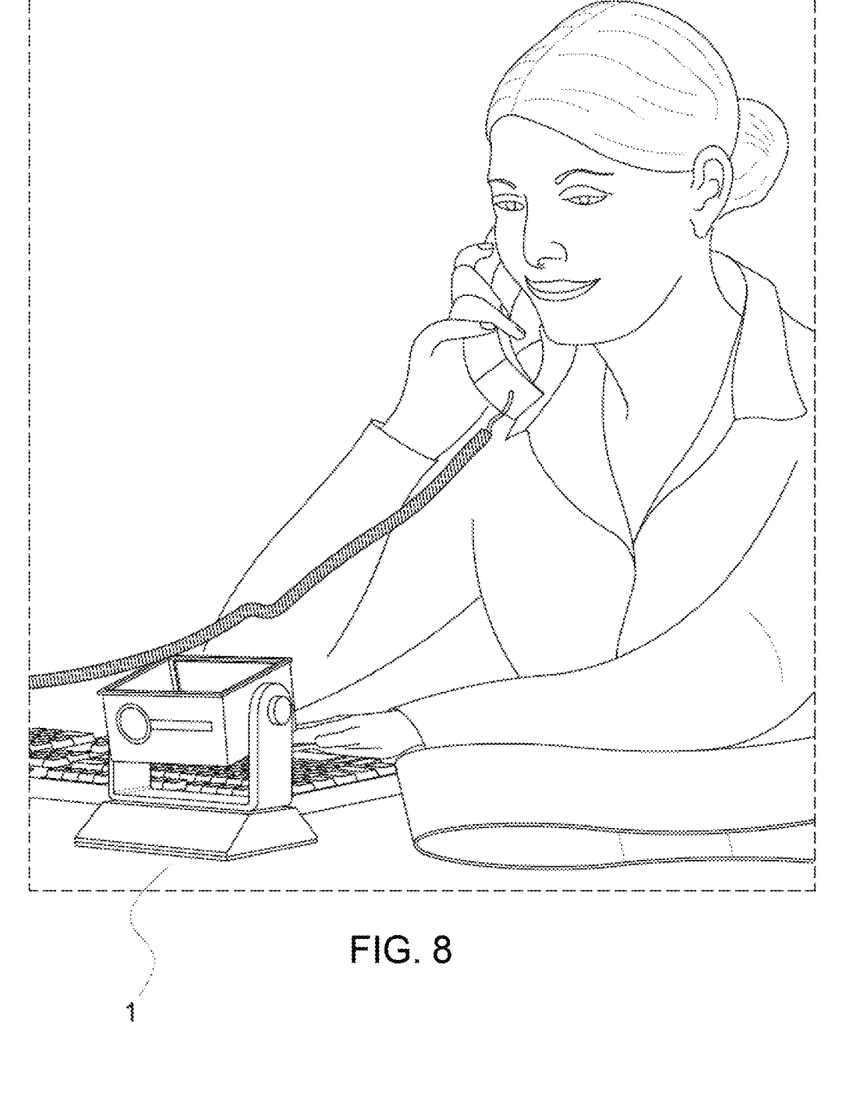
FIG. 8 is an illustration of an ID magnifying device sitting flat on a horizontal surface, in accordance with an embodiment of the present invention.

FIG. 8 is an illustration of an ID Magnifying Device sitting flat on a horizontal surface, in accordance with an embodiment of the present invention. In the present embodiment shown, ID Magnifying Device 1 is placed on a top surface of a desk. Alternatively, ID Magnifying Device 1 may be secured to top surface of the desk with the base section or with the U-bracket (without the base section) utilizing, but not limited to, screws, nails, adhesive, etc.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing an ID Magnifying Device according to the present invention will be apparent to those skilled in the art. Various aspects of the invention have been described above by way of illustration, and the specific embodiments disclosed are not intended to limit the invention to the particular forms disclosed. The particular implementation of ID Magnifying Device may vary depending upon the particular context or application. By way of example, and not limitation, the ID Magnifying Device described in the foregoing were principally directed to magnifying small ID implementations; however, similar techniques may instead be applied to magnifying other objects, insect specimens, animal, plant, piece of a mineral, etc., used as an example of its species or type for scientific study or display, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre AIA) or 35 USC 112(f) post-AIA. Otherwise, no limitations from the specification are to be read into any claims, unless those limitations are expressly included in the claims.

What is claimed is:

1. A device comprising:
   a compartment section, wherein said compartment section is configured to host ID or cards;
   a bottom wall disposed on a proximate bottom portion of said compartment section;
   at least three or more closed sidewalk and an open sidewall generally surrounds said compartment section, wherein said open sidewall is configured to be operable for accepting a magnifying lens, for magnifying said ID or card for viewing;
   a magnifying lens, said magnifying lens is configured to magnify said ID or card for viewing;
   an open area disposed on a proximate top portion of said compartment section, wherein said open area is configured as an entry point of said ID or card;
   a base section that is configured to support said device against a surface area;
   a U-shaped bracket implement, said U-shaped bracket implement is configured to be operable for engaging said compartment section to said base section; and
   a tension screw implement comprising two tension screws that are configured to be operable for securing said compartment to said U-shaped bracket arms, in which said tension screw comprises an extended part with a non-threaded portion and a threaded portion.

2. The device of claim 1, in which said U-shaped bracket implement comprises at least two (2) U-shaped bracket arms and a bottom portion, wherein said bottom portion is configured to be operable for engaging said base section.

3. The device of claim 2, in which a proximate end portion of said at least two (2) Ushaped bracket arms comprises an aperture.

4. The device of claim 3, in which said bottom portion of said U-shaped bracket implement comprises at least two or more holes for accepting screws.

5. The device of claim 4, further comprising at least a fastening mechanism that is configured to be operable for engaging said bottom portion of said U-shaped. bracket implement to said base section.

6. The device of claim 5, in which said fastening mechanism comprises at least one of, a screw, a nail, and a nut and bolt.

7. The device of claim 6, in which at least two of said sidewalls of said compartment section comprises an attachment means.

8. The device of claim 7, in which said attachment means comprises an extended part with a threaded aperture.

9. The device of claim 5, in which a proximate top portion of said base section comprises two or more threaded or non-threaded apertures.

10. The device of claim 1, in which said tension screw comprises a head portion for allowing a user to apply tension to hold the compartment section in place.

11. The device of claim 1, further comprising at least a lining material disposed on a proximate bottom portion of said base section, wherein said lining material that is configured to support the device against a surface.

12. The device of claim 11, in which said lining material comprises at least a textured or a grip rubber, plastic, or silicone material that is configured to support the device against said surface.

13. The device of claim 1, further comprising at least a magnifying lens frame configured to engage said magnifying lens to said open area.

14. The device of claim 13, in which said lens frame comprises a lens frame channel.

15. The device of claim 1 further comprising a lens frame channel guide, said lens frame channel guide is configured to be operable for engaging said lens frame channel.

16. A device comprising:
   a compartment section, wherein said compartment section is configured to host ID or cards;
   a bottom wall disposed on a proximate bottom portion of said compartment section;
   at least three or more closed sidewalls and an open sidewall generally surrounds said compartment section, wherein said open sidewall is configured to be operable for accepting a magnifying lens, for magnifying said ID or card for viewing;
   a magnifying lens, said magnifying lens is configured to magnify said ID or card for viewing;
   an open area disposed on a proximate top portion of said compartment section, wherein said open area is configured as an entry point of said ID or card;
   a base section that is configured to support said device against a surface area;
   a U-shaped bracket implement, said U-shaped bracket implement is configured to be operable for engaging said compartment section to said base section;
   a lens frame disposed on said magnifying lens, wherein said lens frame is configured to engage said magnifying lens to said open area;
   a lens frame channel guide disposed in said open area, wherein said lens frame channel guide is configured to engage said lens frame; and
   a lens frame channel disposed in said lens frame, wherein said lens frame channel is configured to slide through said lens frame channel guide to hold said magnifying lens in place.

* * * * *